US008384640B2

(12) United States Patent
Wu et al.

(10) Patent No.: US 8,384,640 B2
(45) Date of Patent: Feb. 26, 2013

(54) IMAGE PROCESSING METHOD AND RELATED APPARATUS FOR A DISPLAY DEVICE

(75) Inventors: Chung-Wen Wu, Yilan County (TW); Min-Jung Chen, Changhua County (TW); Wen-Hsuan Lin, Taipei County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 979 days.

(21) Appl. No.: 11/762,039

(22) Filed: Jun. 12, 2007

(65) Prior Publication Data

US 2008/0260280 A1 Oct. 23, 2008

(30) Foreign Application Priority Data

Apr. 17, 2007 (TW) ............................... 96113520 A

(51) Int. Cl.
*G06K 9/40* (2006.01)

(52) U.S. Cl. ............................. 345/98; 345/204; 345/89

(58) Field of Classification Search .................... 345/89, 345/204, 98

See application file for complete search history.

(56) References Cited

U.S. PATENT DOCUMENTS

| | | | | |
|---|---|---|---|---|
| 6,583,844 | B1 * | 6/2003 | Mishima et al. | 349/149 |
| 6,774,868 | B1 * | 8/2004 | Bowen | 345/1.1 |
| 6,927,766 | B2 * | 8/2005 | Tagawa et al. | 345/204 |
| 7,161,573 | B1 * | 1/2007 | Takatori et al. | 345/96 |
| 7,495,646 | B2 * | 2/2009 | Kawabe et al. | 345/95 |
| 7,557,791 | B2 * | 7/2009 | Tokumura | 345/98 |
| 7,652,648 | B2 * | 1/2010 | Takatori et al. | 345/89 |
| 7,696,975 | B2 * | 4/2010 | Yang et al. | 345/100 |
| 7,742,019 | B2 * | 6/2010 | Takahara | 345/76 |
| 2004/0189583 | A1 | 9/2004 | Park | |
| 2005/0168490 | A1 * | 8/2005 | Takahara | 345/690 |
| 2005/0225545 | A1 * | 10/2005 | Takatori et al. | 345/204 |
| 2006/0164380 | A1 * | 7/2006 | Yang et al. | 345/103 |
| 2007/0008342 | A1 * | 1/2007 | Sethuraman et al. | 345/635 |
| 2007/0217762 | A1 * | 9/2007 | Yahata | 386/94 |
| 2008/0037948 | A1 * | 2/2008 | Yahata | 386/46 |
| 2009/0079874 | A1 * | 3/2009 | Krijn | 348/699 |

FOREIGN PATENT DOCUMENTS

| | | |
|---|---|---|
| TW | 577040 | 2/2004 |
| TW | I243353 | 11/2005 |

* cited by examiner

*Primary Examiner* — Bipin Shalwala
*Assistant Examiner* — Afroza Chowdhury
(74) *Attorney, Agent, or Firm* — Winston Hsu; Scott Margo

(57) ABSTRACT

An image processing method for a display device, for enhancing image quality, includes receiving video signals, sequentially generating a plurality of image data according to the video signals, and sequentially displaying the plurality of image data on a panel of the display device. Each of the plurality of image data includes a frame data and a low-gray-level frame data respectively corresponding to a frame output duration and a vertical blanking duration in a timing sequence of the video signals.

16 Claims, 6 Drawing Sheets

IMAGE PROCESSING METHOD AND RELATED APPARATUS FOR A DISPLAY DEVICE

BACKGROUND OF THE INVENTION

1. Field of the Invention

The present invention is related to an image processing method and related apparatus for a display device, and more particularly, to an image processing method and related apparatus that reaches black frame insertion effect without performing frequency multiplication for frame data.

2. Description of the Prior Art

The advantages of a liquid crystal display (LCD) include lighter weight, less electrical consumption, and less radiation contamination. Thus, the LCD monitors have been widely applied to various portable information products, such as notebooks, PDAs, etc. In an LCD monitor, incident light produces different polarization or refraction effects when the alignment of liquid crystal molecules is altered. The transmission of the incident light is affected by the liquid crystal molecules, and thus magnitude of the light emitting out of liquid crystal molecules varies. The LCD monitor utilizes the characteristics of the liquid crystal molecules to control the corresponding light transmittance and produces gorgeous images according to different magnitudes of red, blue, and green light.

Please refer to FIG. 1, which illustrates a schematic diagram of a prior art thin film transistor (TFT) LCD monitor 10. The LCD monitor 10 includes an LCD panel 100, a control circuit 102, a data-line-signal output circuit 104, a scan-line-signal output circuit 106, and a voltage generator 108. The LCD panel 100 is constructed by two parallel substrates, and the liquid crystal molecules are filled up between these two substrates. A plurality of data lines 110, a plurality of scan lines 112 that are perpendicular to the data lines 110, and a plurality of TFTs 114 are positioned on one of the substrates. There is a common electrode installed on another substrate, and the voltage generator 108 is electrically connected to the common electrode for outputting a common voltage Vcom via the common electrode. Please note that only four TFTs 114 are shown in FIG. 1 for clarity. Actually, the LCD panel 100 has one TFT 114 installed in each intersection of the data lines 110 and scan lines 112. In other words, the TFTs 114 are arranged in a matrix format on the LCD panel 100. The data lines 110 correspond to different columns, and the scan lines 112 correspond to different rows. The LCD monitor 10 uses a specific column and a specific row to locate the associated TFT 114 that corresponds to a pixel. In addition, the two parallel substrates of the LCD panel 100 filled up with liquid crystal molecules can be considered as an equivalent capacitor 116.

The operation of the prior art LCD monitor 10 is described as follows. When the control circuit 102 receives a horizontal synchronization signal 118 and a vertical synchronization signal 120, the control circuit 102 generates corresponding control signals respectively inputted into the data-line-signal output circuit 104 and the scan-line-signal output circuit 106. The data-line-signal output circuit 104 and the scan-line-signal output circuit 106 then generate input signals to the LCD panel 100 for turning on the corresponding TFTs 114 and changing the alignment of liquid crystal molecules and light transmittance, so that a voltage difference can be kept by the equivalent capacitors 116 and image data 122 can be displayed in the LCD panel 100. For example, the scan-line-signal output circuit 106 outputs a pulse to the scan line 112 for turning on the TFT 114. Therefore, the voltage of the input signal generated by the data-line-signal output circuit 104 is inputted into the equivalent capacitor 116 through the data line 110 and the TFT 114. The voltage difference kept by the equivalent capacitor 116 can then adjust a corresponding gray level of the related pixel through affecting the related alignment of liquid crystal molecules positioned between the two parallel substrates. In addition, the data-line-signal output circuit 104 generates the input signals, and magnitude of each input signal inputted to the data line 110 is corresponding to different gray levels.

Since the physical performance of liquid crystal molecules is similar to a capacitor, the response speed of the liquid crystal molecules may be too slow. In addition, unlike a cathode ray tube (CRT) display applying an impulse-type driving method, an LCD display applying a hold-type driving method has a motion blur phenomenon caused by image edges of a moving subject. In order to reduce the motion blur phenomenon, the prior art provides a black frame insertion technique, or pseudo impulse-type driving technique, to shorten durations of original frames and insert pure black sub-frames or sub-frames with low gray values. In short, the black frame insertion technique inserts a sub-frame with a gray value equal to 0 or a comparative low value between two adjacent frames.

Please refer to FIG. 2 and FIG. 3. FIG. 2 is a schematic diagram of frames of a pixel when performing the prior art black frame insertion technique, and FIG. 3 is a schematic diagram of light intensity generated by the prior art pixel. Shadow areas represent received driving data P0, P1, P2, etc. of the pixel in each frame duration, and the driving data P0, P1, P2, etc. are respectively corresponding to the frames F0, F1, F2, etc. As shown in FIG. 2, gray values of the driving data return to zero (or a comparative low value) before the next driving data is inputted. In such circumstance, variation of the light intensity of the pixel applied the black frame insertion technique is similar to that of a pixel applied the impulse type driving method.

Although the prior art black frame insertion technique can eliminate the motion blur problem, the frame rate frequency must be multiplied, which not only consumes system resources, but also causes risks of electromagnetic radiation problems such as electromagnetic interference. In addition, with the prior art black frame insertion technique, pixels display gray level data correctly for only half of the frame time, and display black frame with gray values of 0 on the other time. In other words, the black frame insertion technique decreases the average brightness of the whole frame and affects image quality.

SUMMARY OF THE INVENTION

It is therefore a primary objective of the claimed invention to provide an image processing method and related apparatus for a display device.

The present invention discloses an image processing method for a display device for enhancing image quality, which comprises receiving video signals, generating a plurality of image data sequentially according to the video signals, each of the plurality of image data comprising a frame data and a low-gray-level frame data respectively corresponding to a frame output duration and a vertical blanking duration of a timing sequence of the video signals and displaying the plurality of image data on a panel of the display device sequentially.

The present invention further discloses a display device capable of enhancing image quality which comprises a reception end for receiving video signals, a display panel, a video processing unit coupled to the reception end, for sequentially generating a plurality of image data according to the video signals, each of the plurality of image data comprising a frame data and a low-gray-level frame data respectively corresponding to a frame output duration and a vertical blanking duration of a timing sequence of the video signals and an output unit coupled to the video processing unit, for displaying the plurality of image data on the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
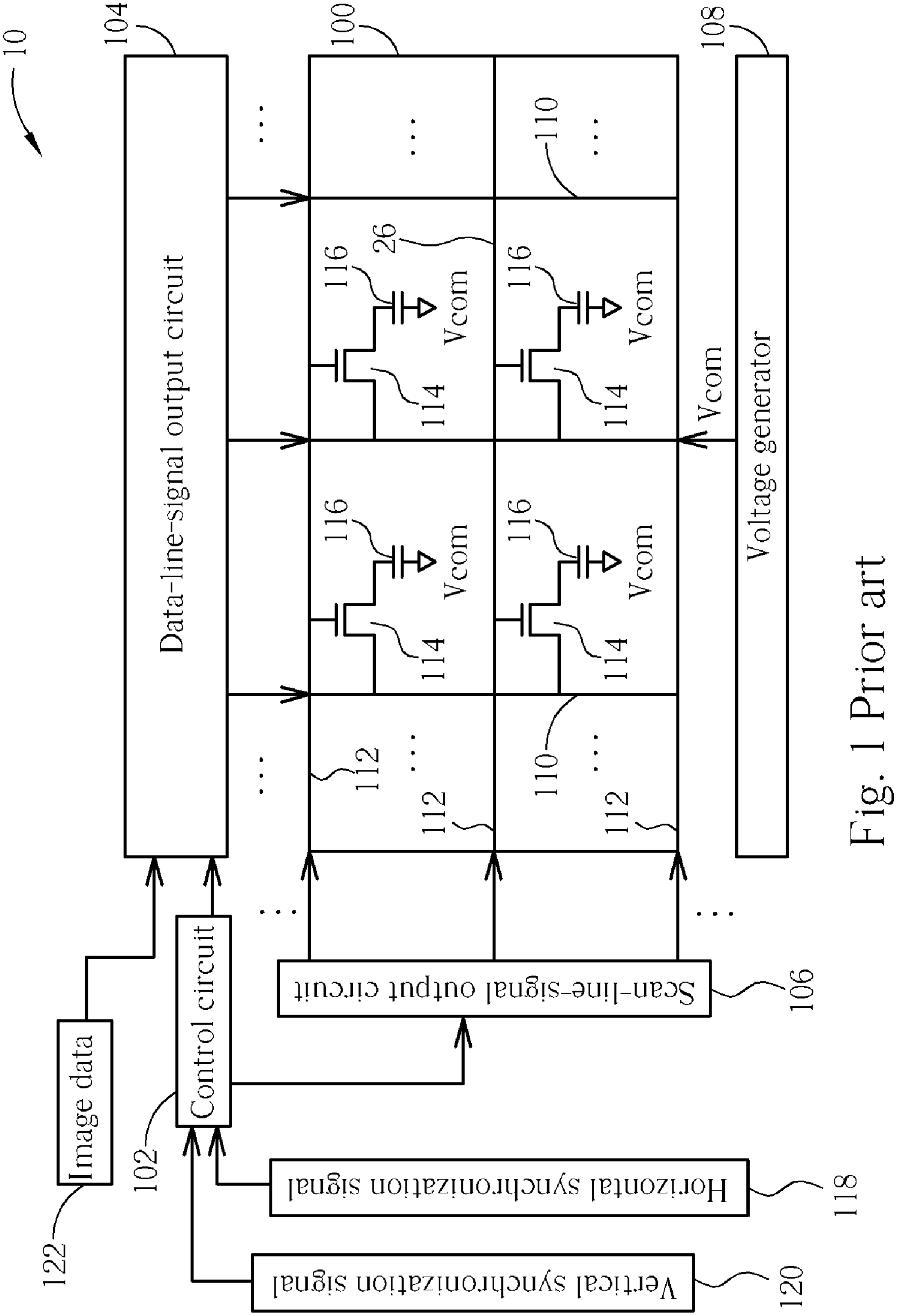
Fig. 1 Prior art
FIG. 1 illustrates a schematic diagram of a thin film transistor liquid crystal display device of the prior art.
Figure 2:
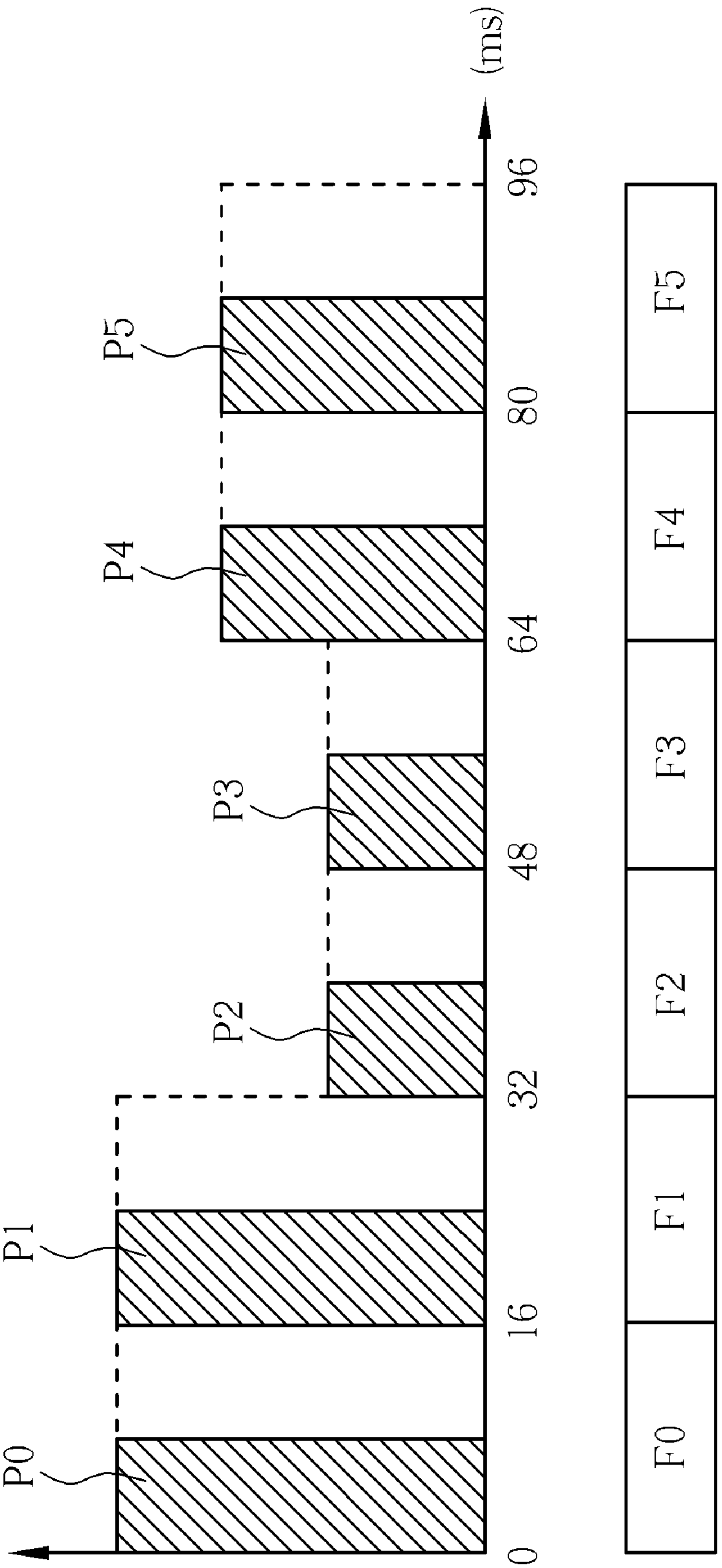
FIG. 2 PRIOR ART
FIG. 2 illustrates a schematic diagram of a prior art black frame insertion technique.
Figure 3:
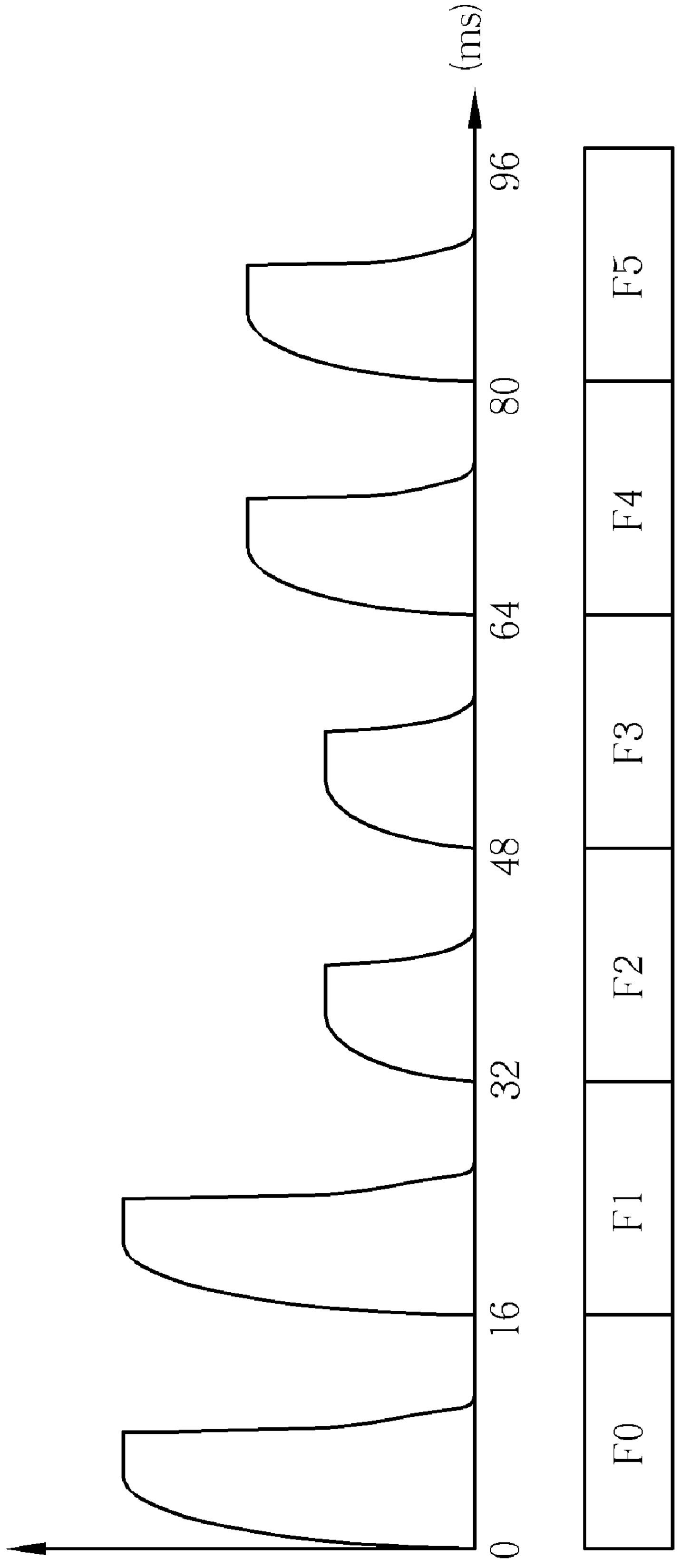
FIG. 3 PRIOR ART
FIG. 3 illustrates a schematic diagram of light intensity corresponding to FIG. 2.
Figure 4:
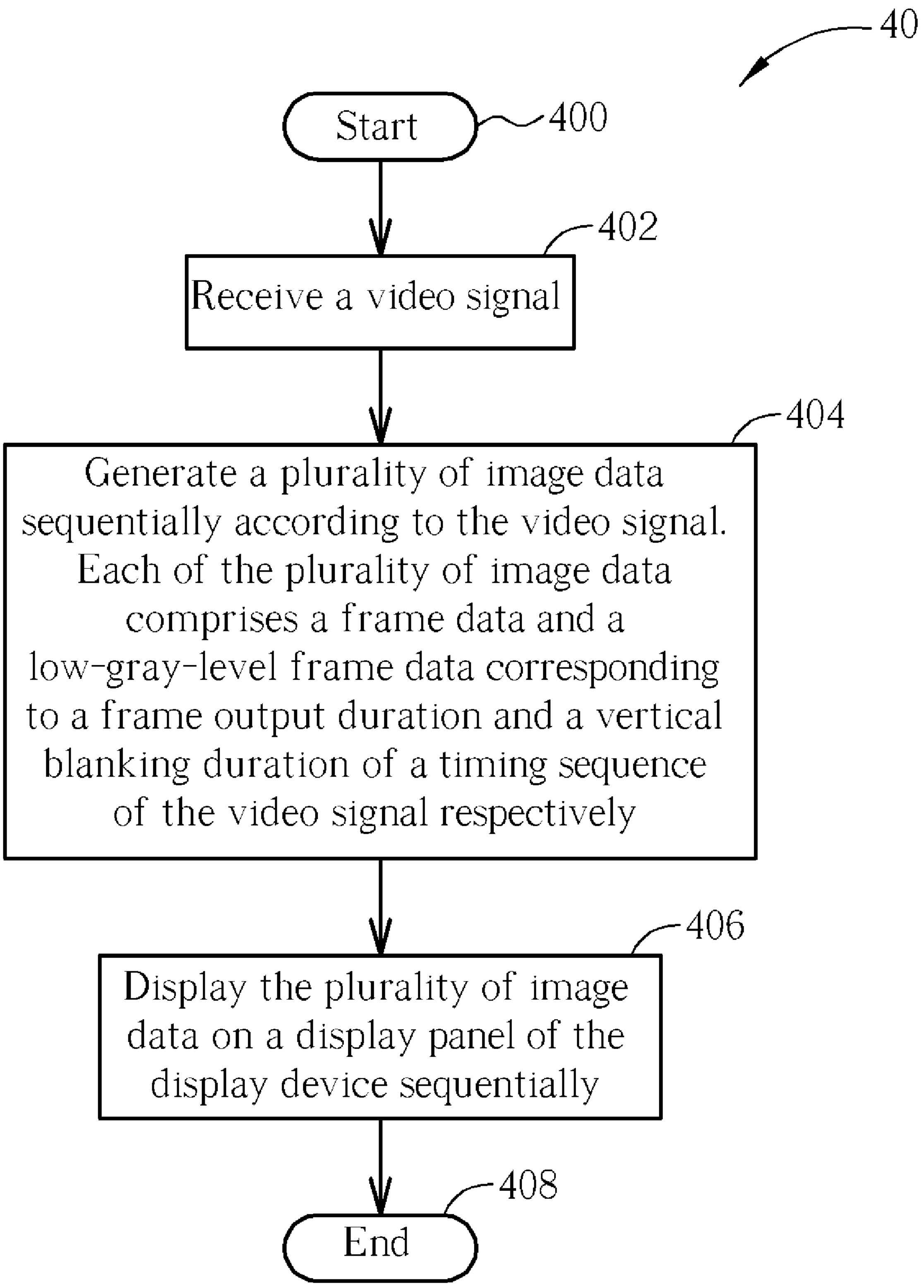
FIG. 4 illustrates a schematic diagram of an image processing process of a display device according to an embodiment of the present invention.

Please refer to FIG. 4, which illustrates a schematic diagram of an image processing process 40 for a display device according to an embodiment of the present invention. The image processing process 40 is able to enhance image quality by the following procedures:

Step 400: Start.

Step 402: Receive a video signal.

Step 404: Generate a plurality of image data sequentially according to the video signal. Each of the plurality of image data comprises a frame data and a low-gray-level frame data corresponding to a frame output duration and a vertical blanking duration of a timing sequence of the video signal respectively.

Step 406: Display the plurality of image data on a display panel of the display device sequentially.

Step 408: End.

According to the image processing process 40, the present invention sequentially displays the frame data and the low-gray-level frame data during the frame output duration and the vertical blanking duration. The gray level value of the low-gray-level frame data is 0 or a relatively lower value. The present invention displays the low-gray-level frame data merely during the vertical blanking duration, therefore the frame data does not have to be performed frequency multiplication, so that system resources can be reduced, and the average brightness of the frame can be maintained to enhance the image quality.

In order to clearly disclose the present invention, the followings explain the meaning of the vertical blanking duration. The earliest motion image display device is a CRT (cathode ray tube) display device, which utilizes the visual persistence of human eyes, segments image signals, and sequentially scans each horizontal line through a cathode ray tube, so as to display the whole frame on the display panel. After the cathode ray tube sequentially scans from one end to another end of a horizontal line, the cathode ray tube moves to the next horizontal line and starts the next scan. To scan the next horizontal line, the moving process requires a sufficient time to orient the cathode ray tube to a starting position of the next horizontal line. Therefore, in the video timing mechanism, image signals are divided into a horizontal section and a vertical section. In addition to the image data of each horizontal line in the horizontal section, the horizontal section further comprises a blanking signal inserted between each section of image data. Each blanking signal can be divided to a front porch signal, an Hsync signal, and a back porch signal. The front porch and the back porch signals do not contain any data, and are used for providing sufficient time to orient the cathode ray tube to the scanning starting point. The Hsync signal is for notifying the cathode ray tube when to start scanning. After finishing scanning a whole frame, the cathode ray tube returns to the upper left of the display panel to rescan the next new frame. Hence, the vertical section also comprises a front porch signal, a Vsync signal and a back porch signal, which have same functions as the horizontal section, for providing sufficient time to orient the cathode ray tube to the scanning starting point, and start scanning at the proper time. The related timing regulations can be found in the Generalized Timing Formula of the Video Electronics Standards Association, and will not be narrated in detail.

Considering compatibilities after the display era changes from CRT to LCD, the traditional CRT standard is still used for an image timing technique of the LCD device. The horizontal and vertical blanking duration evolves to control starts of horizontal and vertical pixels, and video signals contain no content in the horizontal and the vertical blanking duration.

The present invention utilizes the vertical blanking duration properties, and inserts low-gray-level frame data (meaning a black frame) in the vertical blanking duration. In this way, black frame insertion effects can be reached without multiplying frequency of the frame data. Meanwhile, the average brightness of the whole frame is enhanced. In comparison, the frame data must be performed frequency multiplication in the prior art black frame insertion, which consumes system resources, and decreases image quality and the average brightness of the whole frame.

Figure 5:
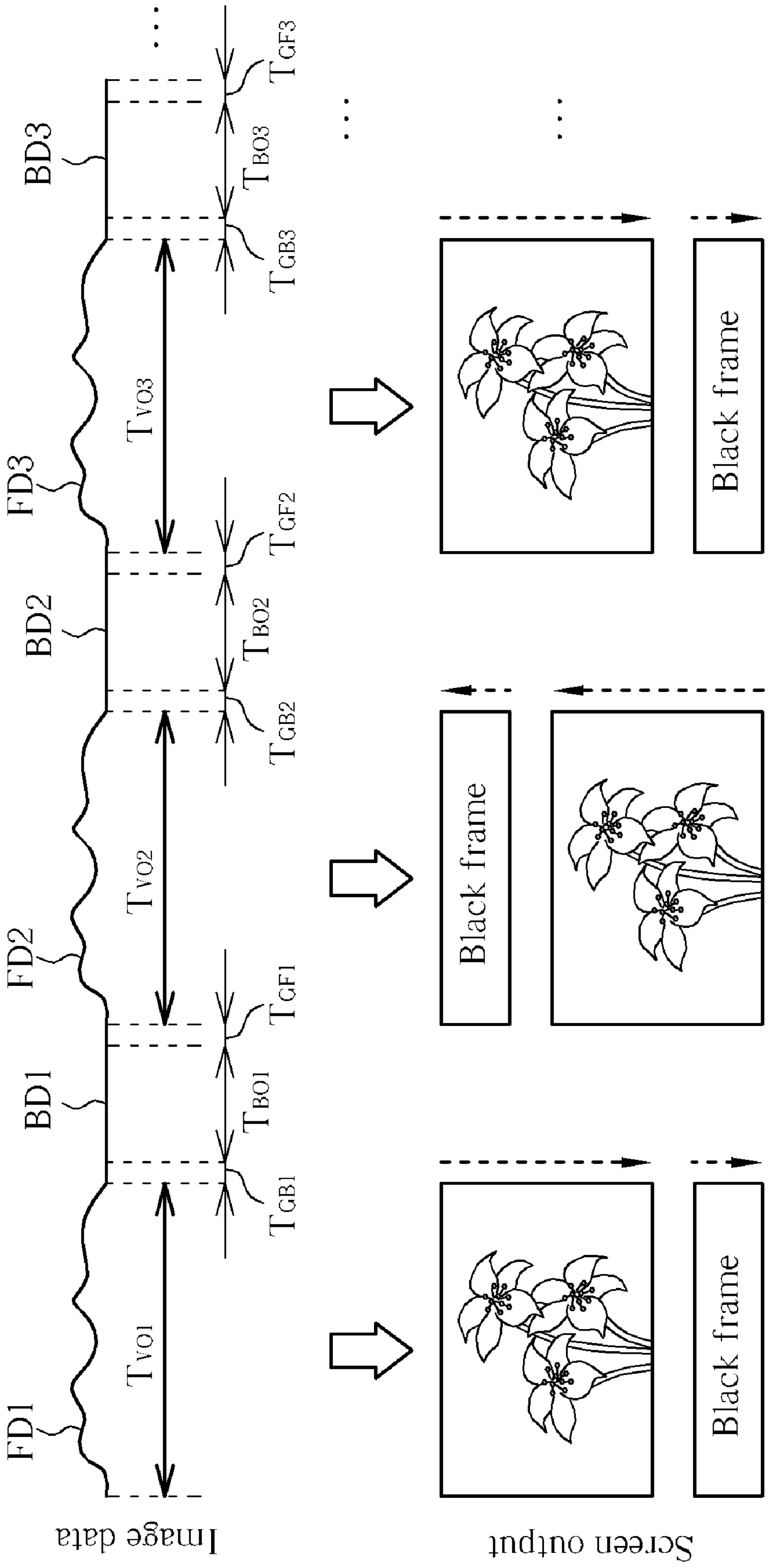
FIG. 5 illustrates a schematic diagram of the image data output according to an embodiment of the present invention.

On the other hand, in order to avoid unequal brightness cause by black frame insertion, when the present invention displays image data (step 406), image data can be displayed with two different scanning methods sequentially (from above to bottom and from bottom to above). Under this condition, the output condition of the image data is shown in FIG. 5. In FIG. 5, the upper half represents a series of image data, and the bottom half shows frames displayed on the display panel. FD1, FD2, FD3 . . . represent frame data, BD1, BD2, BD3 . . . represent low-gray-level frame data, TVO1, TVO2, TVO3 . . . represent frame displaying durations, TBO1, TBO2, TBO3 . . . represent vertical blanking durations, TGF1, TGF2, TGF3 . . . represent gap durations between image data, and TGB1, TGB2, TGB3 . . . represent gap durations between the frame data and the low-gray-level frame data. Also, the vertical arrows indicate direction of the scanning sequence, from above to bottom or from bottom to above. For instance, the frame data FD1 and the low-gray-level frame data BD1 are scanned from above to bottom, and the frame data FD2 and the low-gray-level frame data BD2 are scanned from bottom to above. Under this condition, adjacent image data are scanned with different sequences, and uneven brightness can be avoided.

The image processing process 40 inserts the low-gray-level frame data during the vertical blanking duration, so that the frame data does not have to be performed frequency multiplication, and the average brightness of the whole frame is increased. Adjacent frame data are scanned with different sequences to avoid uneven brightness. For actually realizing the image processing process 40, those skilled in the art can practice with specific hardware and software based on the previous description.

Figure 6:
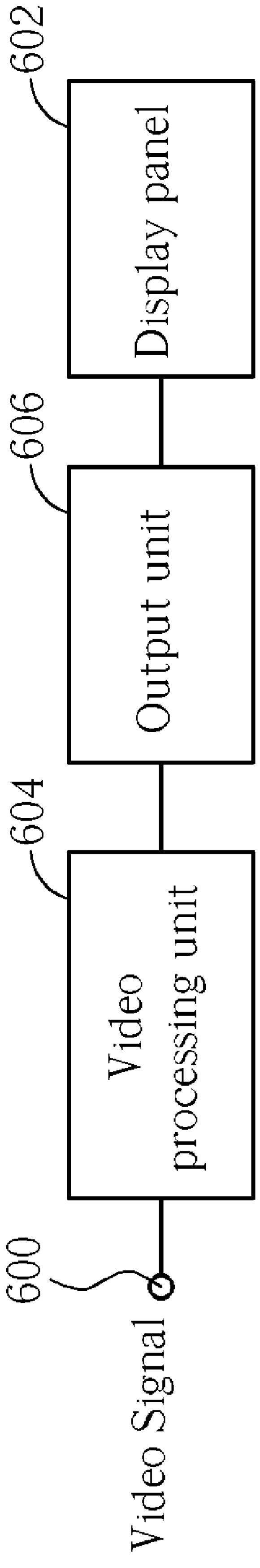
FIG. 6 illustrates a schematic diagram of a display device according to an embodiment of the present invention.

For example, please refer to FIG. 6, which illustrates a schematic diagram of a display device 60 according to an embodiment of the present invention. The display device 60 is capable of enhancing image quality, and comprises a reception end 600, a display panel 602, a video processing unit 604, and an output unit 606. The video processing unit 604 receives video signals through the reception end 600 to generate a plurality of image data. Each image data comprises a frame data and a low-gray-level frame data respectively corresponding to a frame output duration and a vertical blanking duration. The output unit 606 can display the image data on the display panel 602 sequentially, and outputs adjacent image data with different scanning methods. Therefore, the display device 60 inserts the low-gray-level frame data (black frame) during the vertical blanking duration, so that the video processing unit 604 can reach black frame insertion effect without performing frequency multiplication for the frame data. Meanwhile, the frame data does not have to be performed frequency multiplication, which enhances the average brightness of the whole frame. Also, adjacent frame data are scanned with different sequences to avoid uneven brightness. Related output conditions of the image data are shown in FIG. 5, which will not be narrated in detail.

In summary, the present invention utilizes the properties of the vertical blanking duration, and inserts the low-gray-level frame data during the vertical blanking duration, so that frequency multiplication does not have to be performed for the frame data, and the image quality and the average brightness of the frame are enhanced. Meanwhile, adjacent frame data are scanned with different sequences to avoid uneven brightness, which further enhances the image quality. Therefore, the present invention can insert the low-gray-level frame data without multiplying the frequency of the frame rate, which can not only enhance the frame quality, but also save system resources and prevent electromagnetic radiation problems such as electromagnetic interference.

Those skilled in the art will readily observe that numerous modifications and alterations of the device and method may be made while retaining the teachings of the invention.

What is claimed is:

1. An image processing method for a display device, for enhancing image quality, comprising:

receiving video signals;

generating a plurality of image data sequentially according to the video signals, each of the plurality of image data comprising a frame data and a low-gray-level frame data respectively corresponding to a frame output duration and a vertical blanking duration of a timing sequence of the video signals; and sequentially displaying the plurality of image data on a panel of the display device by an alternate sequence of a first scanning sequence and a second scanning sequence, comprising:

scanning the panel of the display device with the first scanning sequence for displaying a first image data of the plurality of the image data during a first period comprising a first frame display duration and a first vertical blanking duration; and scanning the panel of the display device with the second scanning sequence for displaying a second image data of the plurality of the image data during a second period comprising a second frame display duration and a second vertical blanking duration;

wherein the first scanning sequence is scanning the panel from above to bottom, the second scanning sequence is scanning the panel from bottom to above, the second period is adjacent to the first period, and the first image data is different from the second image data, the first image data is adjacent to the second image data.

2. The image processing method of claim 1, wherein the timing sequence of the video signals is set according to Generalized Timing Formula (GTF) of Video Electronics Standards Association (VESA).

3. The image processing method of claim 1, wherein a grey-level value of each low-gray-level frame data is approximately 0.

4. The image processing method of claim 1, wherein a grey-level value of each low-gray-level frame data is smaller than an average grey-level value of all frame data.

5. The image processing method of claim 1, wherein the display device is a liquid crystal display device.

6. The image processing method of claim 1, wherein frequency multiplication is not performed for the frame data of each of the plurality of frame data.

7. The image processing method of claim 1, wherein a gap is between adjacent image data of the plurality of image data.

8. The image processing method of claim 1, wherein a gap is between the frame data and the low-gray-level frame data of each image data.

9. A display device capable of enhancing image quality comprising:

a reception end for receiving video signals;

a display panel;

a video processing unit coupled to the reception end, for sequentially generating a plurality of image data according to the video signals, each of the plurality of image data comprising a frame data and a low-gray-level frame data respectively corresponding to a frame output duration and a vertical blanking duration of a timing sequence of the video signals; and an output unit coupled to the video processing unit, for sequentially displaying the plurality of image data on the display panel by an alternate sequence of a first scanning sequence and a second scanning sequence;

wherein the output unit scans the display panel with the first scanning sequence for displaying a first image data of the plurality of the image data during a first period comprising a first frame display duration and a first vertical blanking duration, and scans the display panel with the second scanning sequence for displaying a second image data of the plurality of the image data during a second period comprising a second frame display duration and a second vertical blanking duration;

wherein the first scanning sequence is scanning the panel from above to bottom, the second scanning sequence is scanning the panel from bottom to above, the second period is adjacent to the first period, and the first image data is different from the second image data, the first image data is adjacent to the second image data.

10. The display device of claim 9, wherein the timing sequence of the video signals is set according to Generalized Timing Formula (GTF) of Video Electronics Standards Association (VESA).

11. The display device of claim 9, wherein a grey-level value of each low-gray-level frame data is approximately 0.

12. The image processing method of claim 9, wherein a grey-level value of each low-gray-level frame data is smaller than the average grey-level value of all frame data.

13. The image processing method of claim 9, wherein the display device is a liquid crystal display device.

14. The image processing method of claim 9, wherein the video process unit does not perform frequency multiplication for the frame data of each of the plurality of image data.

15. The image processing method of claim 9, wherein a gap is between adjacent image data of the plurality of image data.

16. The image processing method of claim 9, wherein a gap is between the frame data and the low-gray-level frame data of each image data.

* * * * *